United States Patent [19]

Oike

[11] Patent Number: 4,841,735

[45] Date of Patent: Jun. 27, 1989

[54] TEMPERATURE CONTROLLER AND METHOD OF TEMPERATURE CONTROL FOR USE IN A REFRIGERATING DEVICE

[75] Inventor: Hiroshi Oike, Osaka, Japan

[73] Assignee: Kabushiki Kaisha Toshiba, Kanagawa, Japan

[21] Appl. No.: 165,605

[22] Filed: Mar. 8, 1988

[30] Foreign Application Priority Data

Mar. 13, 1987 [JP] Japan .................. 62-59702

[51] Int. Cl.$^4$ ............................................. F25B 49/00
[52] U.S. Cl. ...................................... 62/126; 62/127; 340/585
[58] Field of Search ................. 62/126, 127, 129, 130; 165/11.1; 340/585, 587, 588; 236/94; 364/557

[56] References Cited

U.S. PATENT DOCUMENTS

| 4,313,308 | 2/1982 | Boratgis et al. | 62/127 X |
| 4,381,549 | 4/1983 | Stamp, Jr. et al. | 364/551 X |
| 4,387,578 | 6/1983 | Paddock | 62/127 |
| 4,432,210 | 2/1984 | Saito | 62/126 |
| 4,441,329 | 4/1984 | Dawley | 62/126 |

FOREIGN PATENT DOCUMENTS 56-148579 11/1981 Japan .
2111203  6/1983 United Kingdom ............... 340/585

*Primary Examiner*—Harry B. Tanner
*Attorney, Agent, or Firm*—Cushman, Darby & Cushman

[57] ABSTRACT

A temperature controller and method of controlling a refrigerating device includes a temperature sensor for detecting temperature, a conversion circuit, a refrigerating cycle driving circuit, a comparison circuit, a failure decision circuit, and a memory circuit. The conversion circuit converts the temperature detected by the temperature sensor into a voltage value. The refrigerating cycle driving circuit operates a refrigerating cycle to cool a compartment in accordance with the voltage value. The comparison circuit compares the voltage value with a reference voltage range. The reference voltage range is changed by the failure decision circuit to two different states. The reference voltage range in the first state includes an ordinary voltage range corresponding to an ordinary operating temperature range of the refrigerating device. The reference voltage range in the second state includes the first state reference voltage range. When the voltage value is outside the reference voltage range in the second state, it is decided that a failure has occurred in the temperature sensor. When the voltage value is outside the reference voltage range in the first state but inside the second state reference voltage range, it is decided that a failure has occurred in the refrigerating cycle or the refrigerating cycle driving circuit. The failures of the refrigerating device are memorized in the memory circuit.

20 Claims, 4 Drawing Sheets

TEMPERATURE CONTROLLER AND METHOD OF TEMPERATURE CONTROL FOR USE IN A REFRIGERATING DEVICE

BACKGROUND OF THE INVENTION

1. Field of the Invention

The present invention relates, in general, to a refrigerating device. More particularly, the invention relates to a temperature controller and method of controlling temperature in a refrigerating device, and is preferably used in conjunction with a refrigerator.

2. Description of the Prior Art

It is known that a temperature controller of a refrigerating device comprises a sensor circuit and a refrigerating cycle driving device. The sensor circuit outputs a temperature signal obtained frm the voltage division point of a voltage divider circuit comprising a temperature sensor and a resistor. The refrigerating cycle driving device controls operation of the refrigerating cycle to cool an inside, for example, of a refrigerator, in accordance with the voltage value of the temperature signal.

The temperature sensor for detecting the internal temperature of the refrigerator consists of, for example, a thermistor whose resistance value has a negative temperature characteristic. In the voltage divider circuit, D.C. power is connected to the temperature sensor and the resistor connected in series. An example of such a temperature controller for a refrigerating device is disclosed in Japanese Utility - Model Laid-Open Publication No. 56-148579, filed on Apr. 17, 1980 in the name of Yasuhiro Ogita.

In Japanese Utility-Model Laid-Open Publication No. 56-148579, the sensor circuit outputs, through a comparator, the temperature signal obtained from the voltage division point of the voltage divider circuit comprising the temperature sensor and the resistor. A microcomputer controls the operation of the refrigerating cycle for cooling the interior of the refrigerator in accordance with the voltage value of the temperature signal.

In general, there is a possibility for the temperature sensor to be subject to failures, such as a disconnection failure or a continuity failure. In the conventional temperature control circuit, when a disconnection failure occurs in the temperature sensor, the voltage of the temperature signal becomes 0. Accordingly, the refrigerating cycle driving device, such as, e.g., a microcomputer, judges that the temperature inside the refrigerator is extremely low, even though it may in fact be above the set temperature, and therefore does not drive the refrigerating cycle. As a result the temperature inside the refrigerator becomes abnormally high, causing the food stored therein to spoil.

When the continuity failure occurs in the temperature sensor, the voltage of the temperature signal becomes the same high voltage as the D.C. power source. Accordingly, the refrigerating cycle driving device judges that the temperature inside the refrigerator is extremely high, even though it may in fact be below the set temperature, and therefore continue to drive the refrigerating cycle. As a result, the temperature inside the refrigerator becomes abnormally low, causing the food stored therein to be frozen.

SUMMARY OF THE INVENTION

It is an object of the present invention to provide a temperature controller of a refrigerating device which detects a failure in a temperature sensor with distinguished from a failure in a refrigerating cycle thereof.

To accomplish the object described above, the temperature controller of a refrigerating device include a conversion element, a comparison element and a failure decision element.

The conversion element converts the temperature detected by a temperature sensor into a voltage value. The comparison element compares the voltage value with a reference voltage range. The reference voltage range is changed by the failure decision element at least in two states. In the first state the reference voltage range includes an ordinary voltage range corresponding to an ordinary temperature range set for the refrigerating device, and in the second state the reference voltage includes the reference voltage range in the first state. When the voltage value is outside the reference voltage range in the second state, the failure in the temperature sensor is detected.

BRIEF DESCRIPTION OF THE DRAWINGS

The present invention will be explained in detail with reference to the accompanying drawings.

DETAILED DESCRIPTION OF THE PREFERRED EMBODIMENT

Figure 1:
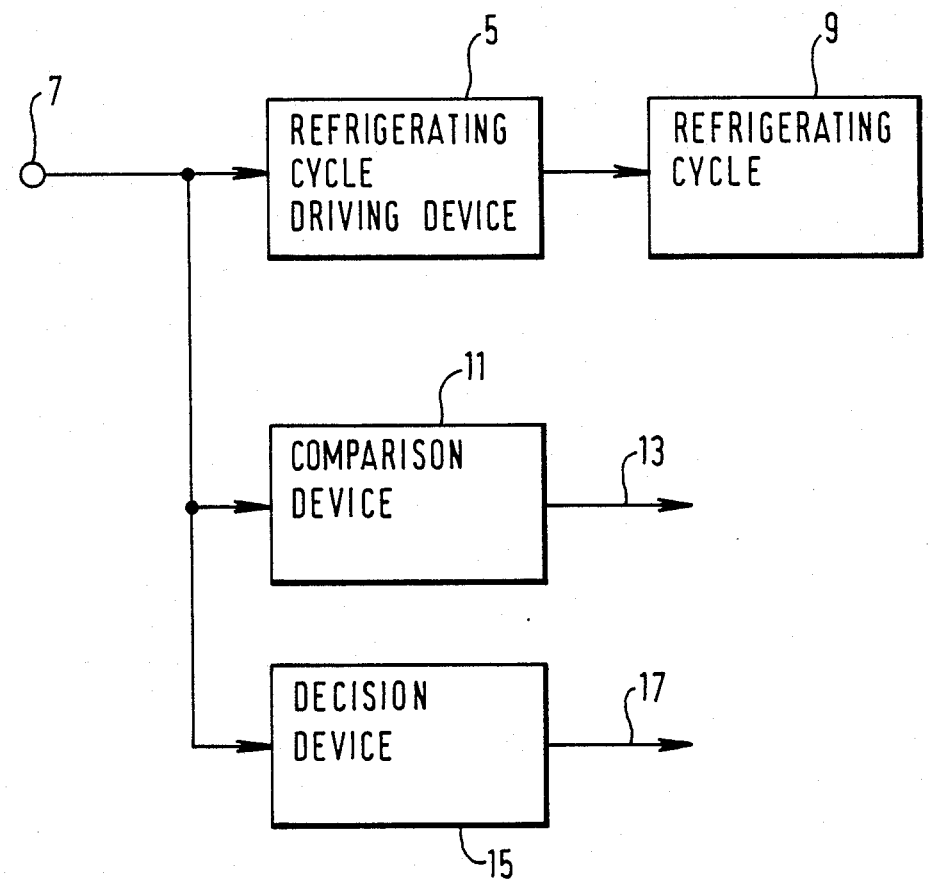
FIG. 1 is a block diagram of the present invention.

As shown in FIG. 1, refrigerating cycle driving device 5, which is similar to the conventional construction, receives sensor signal 7 from a temperature sensor (not shown), and refrigerating cycle device 9, for cooling the inside of a refrigerator, is operated under the control of the refrigerating cycle driving device 5. Comparison device 11 outputs first failure signal 13 if the voltage value of sensor signal 7 is outside a first set voltage range, which is wider than an ordinary voltage range which corresponds to the temperature range for ordinary running of the refrigerator. Decision device 15 outputs second failure signal 17 if the voltage value of sensor signal 7 is outside a second set voltage range, which has been set wider than the first set voltage range.

If a disconnection or continuity failure occurs in the temperature sensor, the voltage value of sensor signal 7 will not only fall outside the first set voltage range of comparison device 11 but also will fall outside the second set voltage range of decision device 15. Therefore, a disconnection failure or continuity failure of the temperature sensor is monitored by both comparison device 11 and decision device 15, and if the first and second failure signal 13 and 17 are output, it can be determined that there is a failure in the temperature sensor.

In contrast, in the case of a failure in refrigerating cycle driving device 5 or refrigerating cycle device 9, the voltage value of sensor signal 7 will fall outside the first set voltage range of comparison device 11, but it will not fall outside the second set voltage range of decision device 15. Therefore, if only first failure signal 13 is output, it can be determined that there is a failure either in refrigerating cycle driving device 5 or in refrigerating cycle device 9.

The circuit diagram of the temperature controller constituting the embodiment of this invention is as follows.

Figure 2:
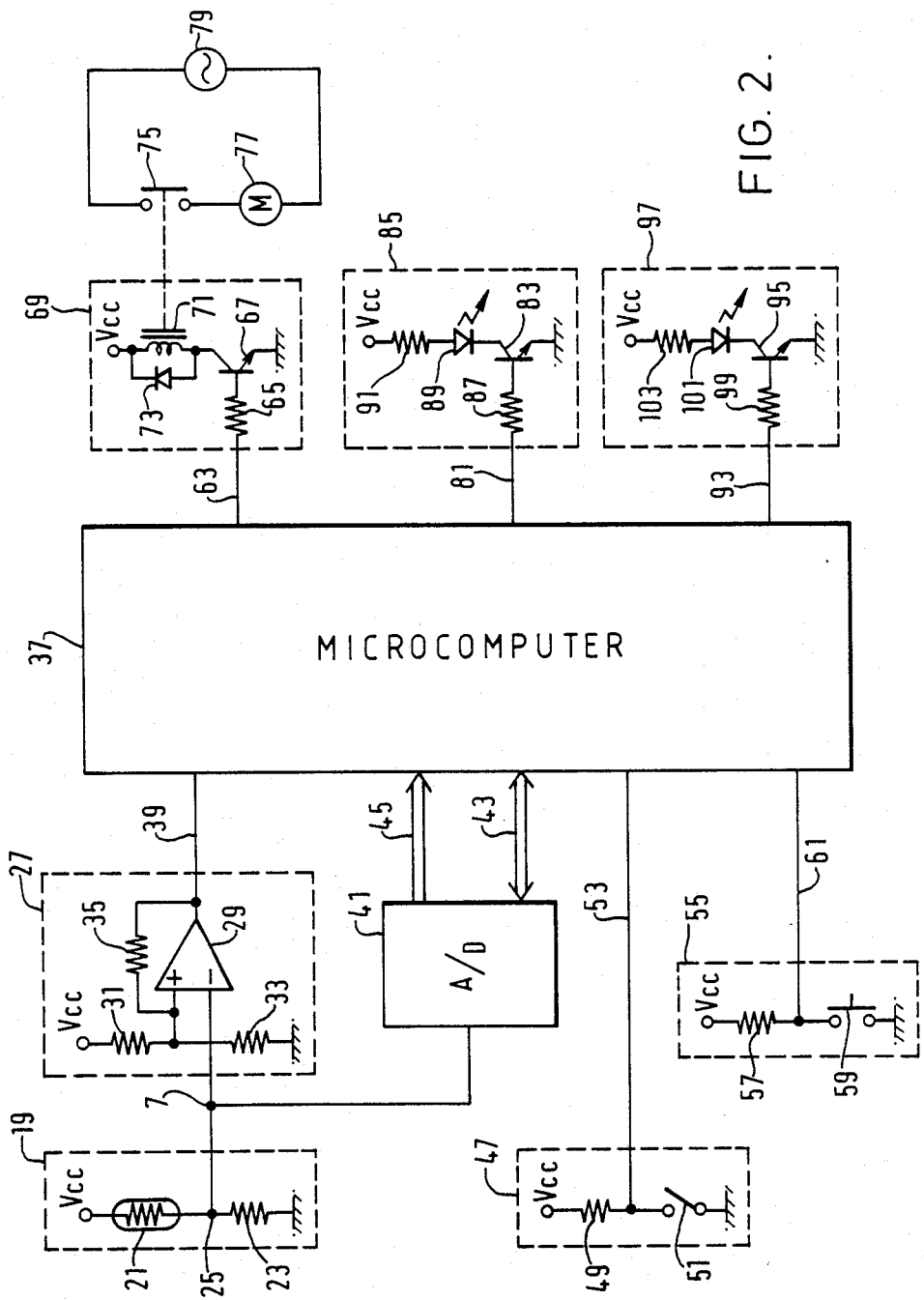
FIG. 2 is a schematic circit diagram of the present invention.

As is shown in FIG. 2, in sensor circuit 19, one end of temperature sensor 21 and one end of resistor 23 are connected at connection point 25. The other end of temperature sensor 21 is connected to D.C. power source Vcc, and the other end of resistor 23 is connected to ground. Temperature sensor 21, can be for example, a thermistor having a negative temperature characteristic. The voltage of connection point 25 is output from sensor circuit 19 as sensor signal 7.

In temperature detection circuit 27, sensor signal 7 is input to an inverting input terminal of comparator 29. The non-inverting input terminal of comparator 29, is connected through resistors 31, 33 and 35 to D.C. power source Vcc, ground, and an output terminal thereof, respectively. The output of comparator 29 is input to microcomputer 37 as detection signal (DS) 39. Microcomputer 37 is a single-chip microcomputer incorporating a memory, timers and input and output ports. Sensor signal 7 is also input to an analog input terminal of A/D converter 41. A/D converter 41 carries out A/D conversion by exchanging A/D control signal 43 with microcomputer 37, and outputs the result of the A/D conversion to microcomputer 37 in the form of a data signal 45.

Switching circuit 47 for switching the temperature sensor failure display mode is constructed such that D.C. power source Vcc is connected to ground via resistor 49 and holding contact 51. The voltage of the connection point between resistor 49 and holding contact 51 is input to microcomputer 37 as switching signal (SW) 53.

Reset circuit 55 for resetting the memory of the failure in temperature sensor 21 is constructed such that D.C. power source Vcc is connected to ground via resistor 57 and manually-operated automatic-reset contact 59. The voltage of the connection point between resistor 57 and contact 59 is input to microcomputer 37 as reset signal (RST) 61. Compressor control signal (CCT) 63 output from microcomputer 37 is input via resistor 65 to the base of NPN transistor 67, in compressor control circuit 69. The emitter of NPN transistor 67 is connected to DC power source Vcc through coil 71 of a relay. Diode 73 is connected to both ends of coil 71, with the cathode connected to D.C. power source Vcc. Relay contact 75 of the relay with coil 71 is connected, in series, with compressor motor 77, to A.C. power source 79. Refrigerating cycle device 9 (not shown) is driven by compressor motor 77.

First display signal (DCT) 81 output from microcomputer 37 to indicate the failure in temperature sensor 21 is input to the base of NPN transistor 83, in first display circuit 85, via resistor 87. The emitter of NPN transistor 83 is connected to ground, while the collector thereof is connected to the cathode of light-emitting diode 89. The anode of light-emitting diode 89 is connected to D.C. power source Vcc through resistor 91.

Second display signal (FCT) 93 output from microcomputer 37 to indicate a failure in refrigerating cycle driving device 5 or refrigerating cycle device 9 is input to the base of NPN transistor 95, in second display circuit 97, via resistor 99. The emitter of NPN transistor 95 is connected to ground, while the collector thereof is connected to the cathode of light-emitting diode 101.

The anode of light-emitting diode 101 is connected to D.C. power source Vcc through resistor 103.

Figure 3:
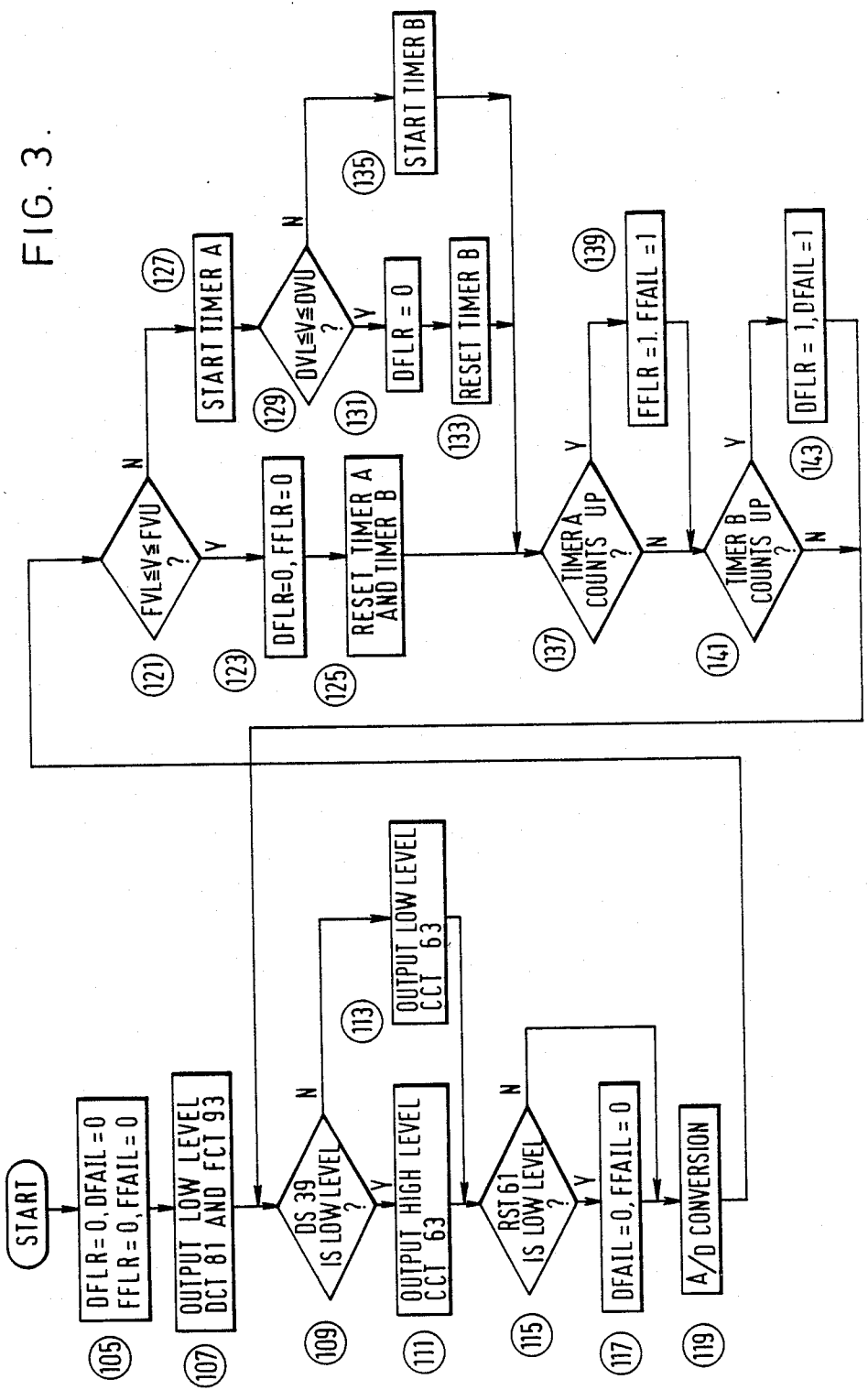
FIGS. 3 and 4 are flow charts illustrating the method of operation of the present invention.

The operation of microcompuer 37 will now be explained with reference to FIGS. 3 and 4. In step 105, the memory addresses in the memory of microcomputer 37 for storing failures in temperature sensor 21, i.e., failure memories DFLR and DFAIL, are set to 0. Also the memory addresses in the memory of microcomputer 37 for storing failures in refrigerating cycle deiving device 5 or refrigerating cycle device 9, i.e., failure memories FFLR and FFAIL, are set to 0.

In step 107, low level first display signal (DCT) 81 and low level second display signal (FCT) 93 are output from microcomputer 37 to first display circuit 85 and second display circuit 97, respectively. Accordingly, NPN transistors 83 and 95 turn OFF and light-emitting diodes 89 and 101 are extinguished.

In step 109, the voltage value of detection signal (DS) 39 is examined. Detection signal (DS) 39 from comparator 29 in temperature detection circuit 27 is normally at a low level when the temperature inside the refrigerator is above the set temperature, and at a high level when the temperature inside the refrigerator is below the set temperature. The set temperature is corresponds to a set voltage input to the non-inverting input terminal (+) of comparator 29, which is determined by the voltage value of D.C. power source Vcc and the resistance value of resistors 31 and 33. In the set value voltage, hysteresis is provided by the positive feedback obtained by the use of resistor 35. The upper limit of the set voltage is VSU and the lower limit is VSL. As the resistance value of temperature sensor 21 has a negative temperature characteristic, the voltage V of the inverting input terminal of comparator 29, i.e., the voltage V of sensor signal 7, increases as the temperature inside the refrigerator rises.

Therefore, when the temperature inside the refrigerator rises and the voltage V of sensor signal 7 rises above the upper limit VSU of the set voltage, detection signal (DS) 39 goes to a low level. When the temperature inside the refrigerator falls and the voltage V of sensor signal 7 falls below the lower limit VSL of the set voltage, detection signal (DS) 39 becomes a high level. When microcomputer 37 receives a low level detection signal (DS) 39, step 111 is executed, in which microcomputer 37 outputs a high level compressor control signal (CCT) 63 to compressor control circuit 69. In compressor control circuit 69, NPN transistor 67 turns ON, D.C. current passes through relay coil 71 and relay contact 75 is closed. Consequently, compressor motor 77 is driven by A.C. power source 79, refrigerating cycle device 9 is started, and the inside of the refrigerator is cooled.

When microcomputer 37 receives a high level detection signal (DS) 39, step 113 is executed, in which microcomputer 37 outputs a low level compressor control signal (CCT) 63 to compressor control circuit 69. Consequently the drive of compressor motor 77 is stopped, and the cooling of the inside of the refrigerator is halted. As described above, if there are no failures in temperature sensor 21, refrigerating cycle driving device 5 or refrigerating cycle device 9, the voltage V of sensor signal 7 is maintained within the voltage range between the upper limit VSU and the lower limit VSL.

In step 115, the voltage level of reset signal (RST) 61 is examined. When manually-operated automatic-reset contact 59, in reset circuit 55, is closed, reset signal (RST) 61 goes to a low level. It is only when reset signal (RST) 61 goes to a low level, that failure memories DFAIL and FFAIL are made 0 in step 117.

In step 119, the voltage V of sensor signal 7 is converted by A/D converter 41 into a digital value. The converted digital voltage value V of sensor signal 7 is input to microcomputer 37 as data signal 45. This conversion process is performed under the control of A/D control signal 43, such as a start conversion request signal and a conversion termination signal, which are exchanged between microcomputer 37 and A/D converter 41.

In step 121, the decision is made as to whether or not the voltage V of sensor signal 7 is between a normal upper limit FVU and a normal lower limit FVL. The normal upper limit FVU is set higher than the set upper limit VSU but lower than Vcc, while the normal lower limit FVL is set at a positive value lower than the set lower limit VSL. In other words, the voltage range of sensor signal 7 between its normal upper voltage limit FVU and its normal lower voltage limit FVL includes the voltage range VSU–VSL for the ordinary working of the refrigerator.

When a failure developes in refrigerating cycle driving device 5 or refrigerating cycle device 9, the voltage V of sensor signal 7 does not fall between FVU and FVL; however, it still does not reach either 0 or Vcc. When a failure such as a disconnection or continuity failure develops in temperature sensor 21, the voltage V of sensor signal 7 reaches 0 or Vcc.

If the voltage V of sensor signal 7 is between FVL and FVU, it is decided that there is no failure in temperature sensor 21, in refrigerating cycle driving device 5, or refrigerating cycle device 9. Accordingly, step 123 is executed, in which failure memories DFLR and FFRL are reset to 0. In step 125, timer A and timer B are reset, after which control passes to step 137.

On the other hand, if there is some failure in refrigerating sensor 21, the voltage V of sensor signal 7 is not between FVL and FVU. Accordingly, step 127 is executed, in which the time count of timer A is started. After step 127, control passes to step 129.

In step 129, a judgement is again made as to whether or not the voltage V of sensor signal 7 is between refrigerating cycle normal upper limit DVU and refrigerating cycle normal lower limit DVL. Refrigerating cycle normal upper limit DVU is set higher than normal upper limit FVU but lower than Vcc, while refrigerating cycle normal lower limit DVL is set at a positive value lower than normal lower limit FVL. In other words, the voltage range between refrigerating cycle normal upper limit DVU and refrigerating cycle normal lower limit DVL includes the voltage range between normal upper limit FVU and normal lower limit FVL.

If the voltage V of sensor signal 7 is between DVL and DVU as a result of there being some failure in refrigerating cycle driving device 5 or refrigerating cycle device 9, while there is no failure in temperature sensor 21, then step 131 is executed, in which failure memory DFLR is reset to 0, and in step 133, timer B is reset. On the other hand, if a failure such as a disconnection or continuity failure develops in temperature sensor 21, the voltage V of sensor signal 7 reaches 0 or Vcc as mentioned above. Therefore the voltage V of sensor signal 7 is not between DVL and DVU, so step 135 is executed in which the operation of timer B is started.

In step 137, the judgement is made whether or not timer A, which started its timing count in step 127, has come to the end of its count, i.e., whether or not the failure in refrigerating cycle driving device 5 or refrigerating cycle device 9 has continued for a prescribed time period, for example one hour. If the failure has not continued for the prescribed time, control passes to step 141. If the failure has continued for the prescribed time period, the judgement is then made that it is a failure in refrigerating cycle driving device 5 or refrigerating cycle device 9, and in step 139 the failure memories FFLR and FFAIL are set to 1, after which control advances to step 141. The fact that failure memories FFLR and FFAIL are only set to 1 if a failure in refrigerating cycle driving device 5 or refrigerating cycle device 9 has continued for the prescribed time period ensures that spurious failure detections are prevented.

In step 141, the judgment is made whether or not timer B, which started its timing count in step 135, has come to the end of its count, i.e., whether or not the failure in temperature sensor 21 has continued for a prescribed time period, for example ten minutes. If the failure has not continued for the prescribed time period, control returns to step 109. If the failure has continued for the prescribed time period, the judgement is then made that it is a failure in temperature sensor 21, and in step 143 the failure memories DFLR and DFAIL are set to 1, after which control returns to step 109. The fact that failure memories DFLR and DFAIL are only set to 1 if the failure in temperature sensor 21 has continued for the prescribed time period ensures that spurious failure detections are prevented.

Temperature sensor 21 is not only subject to permanent failures such as disconnection or continuity failures, but also to intermittent failures due to the effects of humidity, for example, in the atmosphere where the refrigerator is placed. Recovery can sometimes occur even from failures in refrigerating cycle driving device 5 or refrigerating cycle device 9. Even after a failure in refrigerating driving device 5 or refrigerating cycle device 9 and a failure in temperature sensor 21 have been detected, and the failure memories FFLR, FFAIL, DFLR, DFAIL have been set to 1 in step 139 and step 143, respectively, the failure memories FFLR and DFLR are reset to 0 in step 123 if these failures recover. However, the failure memories FFAIL and DFAIL remain set to 1 even after these failures recover, until being reset by reset circuit 55 in step 117.

Figure 4:
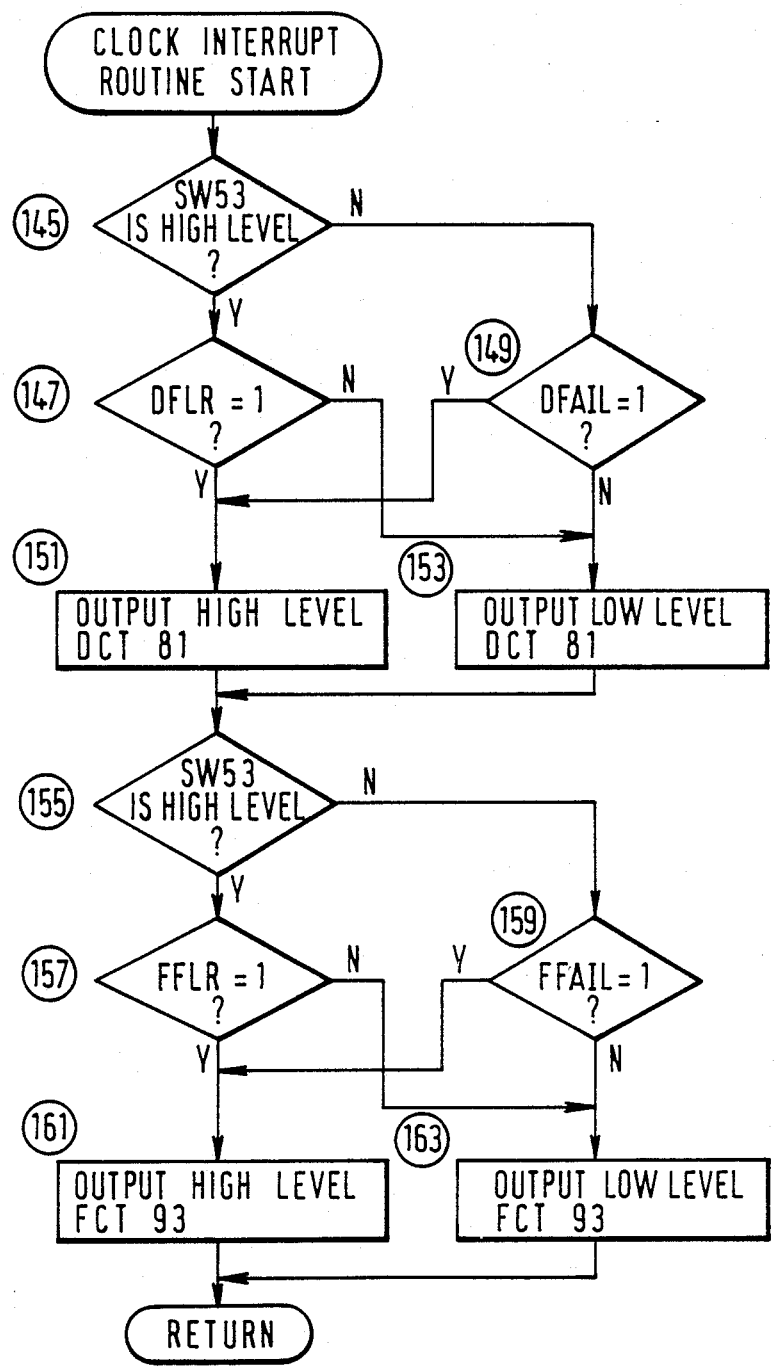

The routine shown in FIG. 4 is executed each time a clock interrupt is generated. The interrupt signal is generated by another timer in microcomputer 37 at, for example, every one second. The routine's purpose is to display the failure in refrigerating cycle driving device 5, refrigerating cycle device 9 or temperature sensor 21, detected and memorized as described above.

In step 145, the voltage level of switching signal (SW) 53 is examined. If switching signal (SW) 53 is at a high level, step 147 is executed in which the content of the failure memory DFLR is examined. If switching signal (SW) 53 is at a low level, step 149 is executed, in which the content of the failure memory DFAIL is examined. In either case, if the content of the failure memory is 1, step 151 is executed, in which high level first display signal (DCT) 81 is output. When high level first display signal (DCT) 81 is output, in first display circuit 85, NPN transistor 83 turns ON and light-emitting diode 89 lights up, indicating that a failure has occurred in temperature sensor 21.

On the contrary, in either case, if the content of the failure memory is 0, step 153 is executed, in which low level first display signal (DCT) 81 is output. NPN transistor 83 turns OFF and light-emitting diode 89 goes out, in first display circuit 85.

In steps 155 to 163 in the same way as described above, second display signal (FCT) 93 is output and light-emitting diode 101 in second display circuit 97 is lit or extinguished according to the content of the failure memories FFLR or FFAIL, in order to indicate whether or not a failure has occurred in refrigerating cycle driving device 5 or refrigerating cycle device 9. One or the other of failure memories FFLR and FFAIL is selected to be displayed depending on the voltage level of switching signal (SW) 53. After execution of step 161 or step 163, the microcompuer returns to the flow-chart shown in FIG. 3.

As explained above, if holding contact 51 in switching circuit 47 is open, light-emitting diodes 89 and 101 light up or go out in accordance with the content of failure memory DFLR and FFLR, respectively. If, on the other hand, holding contact 51 in switching circuit 47 is closed, light-emitting diodes 89 and 101 light-up or go out in accordance with the content of failure memory DFAIL and FFAIL respectively. If light-emitting diode 89 lights up in either case, it shows that a permanent failure has developed in temperature sensor 21. If light-emitting diode 89 lights up when holding contact 51 is closed but goes out when holding contact 51 is open, it indicates that an intermittent failure occurred in temperature sensor 21. Failures in refrigerating cycle driving device 5 or refrigerating cycle device 9 are displayed in the same way.

As can be understood from the above embodiment, therefore, a failure can always be detected whether the failure occurs in temperature sensor 21 or in refrigerating cycle driving device 5 or refrigerating cycle device 9 and whether the failure is permanent or intermittent. Further a failure of temperature sensor 21 can be detected while being distinguished from a failure of refrigerating cycle driving device 5 or refrigerating cycle device 9. Still further, it can be discriminated whether these failures of temperature sensor 21 and refrigerating cycle driving device 5 or refrigerating cycle device 9 are permanent or intermittent, which provides a clue as to the cause of the failure when maintenance is carried out.

The present invention has been described with respect to a specific embodiment. However, other embodiments based on the principles of the present invention should be obvious to those of ordinary skill in the art. For example, a comparator such as that being employed in temperature detection circuit 27 may be adopted instead of A/D converter 41. A flip-flop gate may be adopted as a memory device. Such embodiments are intended to be covered by the claims.

What is claimed is:

1. A temperature controller for use in a refrigerating device and including a temperature sensor for detecting temperature, said temperature controller comprising:
   conversion means for converting the temperature detected by the temperature sensor into a voltage value;
   refrigerating cycle driving means for operating a refrigerating cycle to cool a compartment in accordance with the voltage value;
   comparison means for comparing the voltage value with a changeable voltage range;
   failure decision means for setting the changeable voltage range in at least two states, in a first state the changeable voltage range being set wider than an ordinary voltage range corresponding to an ordinary operating temperature range for the compartment and in a second state the changeable voltage range being set wider than the voltage range in the first state; and
   memory means for storing a predetermined value when said comparison means determines the voltage value as being outside the changeable voltage range.

2. A temperature controller as in claim 1 further including display means for indicating a failure in the refrigerating device in accordance with the pedetermined value stored in the memory means.

3. A temperature controller as in claim 2, said memory means including a reset circuit for changing the predetermined value stored therein.

4. A temperature controller as in claim 3, said memory means further including a first memory storage area set to a predetermined value when said comparison means determines the voltage value as being outside the changeable voltage range in the first state.

5. A temperature controller as in claim 4, said memory means further including a second memory storage area set to a predetermined value when said comparison means determines the voltage value as being outside the changeable voltage range in the second state.

6. A temperature controller as in claim 4, said first memory storage area including two memory elements to be set respectively when said comparison means determines the voltage value as being outside the changeable voltage range in the first state, one of said two memory elements being reset by said reset circuit.

7. A temperature controller as in claim 5, said second memory storage area including two memory elements to be set respectively when said comparison means determines the voltage value as being outside the changeable voltage range in the second state, one of said two memory elements being reset by said reset circuit.

8. A temperature controller as in claim 5, said display means including a first display circuit for indicating a failure in said refrigerating cycle driving device or said refrigerating cycle, in accordance with the predetermined value set in the first memory storage area.

9. A temperature controller as in claim 8, said display means including a second display circuit for indicating a failure in said temperature sensor, in accordance with the predetermined value set in the second memory storage area.

10. A temperature controller as in claim 6, said display means further including a selection circuit for selecting the memory element whose state is indicated.

11. A temperature controller as in claim 7, said display means further including a selection circuit for selecting the memory element whose state is indicated.

12. A temperature controller as in claim 1, said comparison means including a timer means for ensuring a comparison operation thereof by counting a time period for which the voltage value is outside the changeable voltage range.

13. A temperature controller for use in a refrigerating device, said temperature controller comprising:
   a temperature sensor for detecting temperature in a compartment:
   conversion means for converting the temperature detected by the temperature sensor into a voltage value;

refrigerating cycle driving means for operating a refrigerating cycle to cool the compartment in accordance with the voltage value;

comparison means for comparing the voltage value with a changeable voltage range;

failure decision means for setting the changeable voltage range in at least two states, in a first state the changeable voltage range being set wider than an ordinary voltage range corresponding to an ordinary operating temperature range for the compartment and in a second state the changeable voltage range being set wider than the voltage range in the first state; and memory means for storing a predetermined value when said comparison means determines the voltage value as being outside the changeable voltage range.

14. A temperature controller as in claim 13 further including display means for indicating a failure in the refrigerating device in accordance with the predetermined value stored in the memory means.

15. A temperature controller as in claim 14, said memory means including a reset circuit for changing the predetermined value stored therein.

16. A temperature controller as in claim 15, said memory means further including a first memory storage area set to a predetermined value when said comparison means determines the voltage value as being outside the changeable voltage range in the first state.

17. A temperature controller as in claim 16, said memory means further including a second memory storage area set to a predetermined value when said comparison means determines the voltage value as being outside the changeable voltage range in the second state.

18. A temperature controller as in claim 16, said first memory storage area including two memory elements to be set respectively when said comparison means determines the voltage value as being outside the changeable voltage range in the first state, one of said two memory elements being reset by said reset circuit.

19. A temperature controller as in claim 17, said second memory storage area including two memory elements to be set respectively when said comparison means determines the voltage value as being outside the changeable voltage range in the second state, one of said two memory elements being reset by said reset circuit.

20. A method for detecting a failure in a refrigerating device having a temperature sensor for detecting the temperature and a refrigerating cycle controller for operating a refrigerating cycle, said method comprising the steps of:

converting temperature detected by the temperature sensor into a voltage value;

comparing the voltage value with a first predetermined voltage range being set wider than an ordinary voltage range corresponding to an ordinary operating temperature range for the refrigerating device;

comparing the voltage value with a second predetermined voltage range which is wider than the first predetermined voltage range when the voltage value is outside the first predetermined voltage range;

determining that the failure has occurred in the temperature sensor when the voltage value is outside the second predetermined voltage range and that the failure has occurred in the refrigerating cycle controller or the refrigerating cycle when the voltage value is outside the first predetermined voltage range but is inside the second predetermined voltage range; and memorizing the determined failure in the refrigerating device.

* * * * *